United States Patent Office 3,200,086
Patented Aug. 10, 1965

3,200,086
ULTRAVIOLET LIGHT STABILIZED POLYMERIC MATERIALS HAVING A BENZOPHENONE CHEMICALLY INCORPORATED THEREIN
Ralph A. Coleman, Middlesex, N.J., assignor to American Cyanamid Company, New York, N.Y., a corporation of Maine
No Drawing. Filed Aug. 21, 1961, Ser. No. 132,582
4 Claims. (Cl. 260—2)

This invention relates to the stabilization of polymeric materials against the deteriorating effects of ultraviolet light.

More particularly, this invention relates to the stabilization of synthetic polymeric compositions from the deteriorative effects of ultraviolet light by the incorporation therein of a member of the class of compounds represented by the following Formula I:

(I)
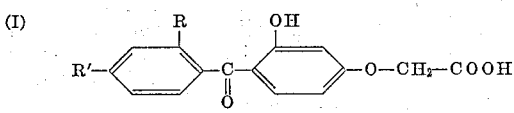

wherein R is either hydrogen or hydroxyl and R' is hydrogen or carboxymethoxy.

A good ultraviolet absorber for use in polymeric materials should absorb the ultraviolet in daylight and at the same time be a colorless material by visual observation. The compound should impart no color to the composition, should be sufficiently stable to withstand the conditions of curing of the polymer, and should absorb ultraviolet light sufficiently to protect the composition against yellowing and decomposition on exposure to ultraviolet light. The compound must have sufficient solubility in various types of materials so that it may be easily incorporated into various plastic formulations, and once incorporated into the resin compositions, it should be capable of withstanding leaching action of solvents or loss by exudation.

Generally, an effective ultraviolet absorber should have its peak absorption above a wave length of 320 millimicrons. The absorption peak may be at a higher wave length, as long as absorption drops off sufficiently as it approaches the visual range so that no color is visible. In addition, to be effective, it should show a high degree of absorbancy in the desired wave length range especially at those wave lengths sufficiently below the visual range so that the compound has no yellow color visually.

Various compounds have heretofore been known for the stabilization of polymeric materials against deterioration by ultraviolet light. They have been deficient in one or more qualities which the ideal ultraviolet absorber must possess, especially with respect to the ability to become firmly incorporated in the polymeric material to be stabilized. This invention is based on the discovery of a new class of compounds, the members of which are eminently suitable as ultraviolet absorbers especially for the stabilization of synthetic polymers containing reactive hydroxyl groups.

It is an object of this invention to provide, as a new class of ultraviolet stabilized modified resins, esters of a 2-hydroxy-4-carboxymethoxybenzophenone of this invention with a polymer containing reactive hydroxyl groups.

Other objects of this invention will be made apparent hereinafter.

It is an advantage of the present invention that the compounds of Formula I can be used as chemically bonded modifiers in the stabilization of the various polymeric materials.

The compounds of Formula I are particularly useful when employed as chemically bonded ultraviolet absorbers for the protection of those resinous copolymers and interpolymers containing reactive hydroxyl groups. The ultraviolet absorbers of this invention when thus used, are bonded to the resin through the ester forming group of the 4 or 4' position of the benzophenone nucleus and the hydroxyl groups of the polymeric material. In being capable of being chemically bonded to the resinous polymer, they are not subject to leaching by solvent action or loss by exudation during use or the molding or film forming process, as the case may be, and thus provide a high degree of permanent stabilization against ultraviolet light.

When used to modify hydroxylic resinous polymers, the compounds of Formula I are added to the various polymerizable mixes before complete polymerization and polymerization is then effected by known methods. Generally, depending on desired properties and intended use, from about 0.1% to about 10.0% of the ultraviolet absorber based on the final weight of the resinous composition may be employed.

Among the suitable hydroxylic polymeric material which can thus be protected are the following:

(1) "Alkyd resins," i.e., those resins which are formed by the condensation of polyhydric alcohols with resinifying carboxylic organic acids or anhydrides thereof, with or without additional modifiers such as resin acid, or other acid modifiers such as abietic acid, fatty acids, such as a vegetable fatty acid (e.g., ADM vegetable acid 520 composed of 6% palmitic acid, 4% stearic acid, 22% oleic acid, 17% linoleic acid and 51% linolenic acid) and drying oils. Suitable acidic components for the preparation of alkyd resins are phthalic anhydride or maleic anhydride along with varying amounts of modifying substances such as citric, malic, tartaric, azaleic, succinic, adipic, sebacic, pimelic and/or 1,8-naphthalic acids. Suitable polyhydric compounds are dihydric alcohols such as ethylene glycol or trihydric alcohols such as glycerol. Alkyd resins are further disclosed in U.S. 2,087,852; 1,950,468 and 1,860,164;

(2) "Polyester resins," i.e., resins formed by the polycondensation of dicarboxylic acids with dihydroxy alcohols, optionally containing varying amounts of monocarboxylic acids, monohydroxy alcohols, and even small amounts of polycarboxylic acids and polyhydroxy alcohols;

(3) "Epoxy resins," i.e., resins resulting from the condensation of epichlorohydrin with polyhydric phenol and also resins made by epoxidation of unsaturated compounds e.g., unsaturated fatty acids and esters, polybutadienes, vegetable oils, vinylcyclohexene, dicyclopentadiene, etc. Examples of such epoxy resins are the diglycidyl ethers of dihydric phenols and epoxy esters of polybasic acids, e.g. diglycidyl phthalides. Epoxy resins are more fully disclosed in U.S. 2,886,473; and (4) "Polyurethane resins," i.e., resins having reoccurring aminoformic ester units, i.e., urethane groups. They are usually derived from polyisocyanates reacted with compounds containing active hydrogens such as polyhydric alcohols, glycols, hydroxylterminated polyethers and hydroxylterminated polyesters. Examples of the most commonly used isocyanates are toluene-2,4-diisocyanate, methylene-bis-4-phenyisocyanate, naphthylene 1,5-diisocyanate, tritolylmethane-triisocyanate, 3,3'-bitolylene-4,4'-diisocyanate, phenyl isocyanate, hexamethylene diisocyanate, naphthyl isocyanate, and 2, 3, 5, 6-tetramethyl-1,4-benzene diisocyanate. Examples of the active hydrogen containing compounds which may be used as components in polyurethane formulations with isocyanates are polyhydroxy compounds such as ethylene glycol, diethylene glycol, various polyethylene glycols, glycerol, pentaerythritol, resorcinol, bis-(4-hydroxyyphenyl)-dimethyl methane, etc.; diethanolamine; and thio compounds such as 2-mercaptoethanol.

The compounds of Formula I are conveniently prepared by reaction of a compound of the Formula II:

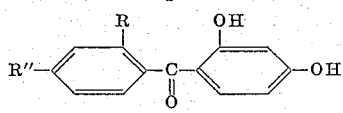

(II)

wherein R'' is hydrogen or hydroxyl and R is as hereinbefore defined with either bromoacetic acid or chloroacetic acid. The reaction is usually conducted in an aqueous medium in the presence of a hydrogen acceptor such as an alkali metal carbonate. When R'' is hydrogen, equimolar amounts of reactants may be employed. When R'' is hydroxyl, the use of two moles of the haloacetic acid reagent per mole of the hydroxybenzophenone derivative will yield the 4,4'-dicarboxymethoxy derivative.

The following examples, in which parts are on a weight basis, are presented for the purpose of further illustrating this invention.

*Example 1*

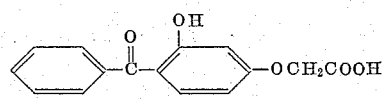

21.4 g. (0.1 mol) of 2,4-dihydroxybenzophenone, 10.6 g. (0.1 mol) of sodium carbonate, 139 g. (0.1 mol) of bromoacetic acid and 150 cc. of water are stirred, while refluxing, for 16 hours. The reaction product is made acid with HCl and the solid which forms is washed with water and recrystallized from toluene to give the product.

*Example 2*

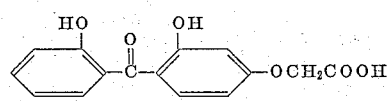

115 g. (0.5 mol.) of 2,2',4-trihydroxybenzophenone, and 53 g. (0.5 mol.) of sodium carbonate are stirred in 1 liter of water and the resulting solution filtered. To this solution is added 69.5 g. (0.5 mol.) of bromoacetic acid in 100 ml. of water and the mixture is heated at 75° C. for 16 hours. The reaction product is made acid with dilute HCl. A red oil separates and is recrystallized from aqueous acetic acid giving brown crystals which are again recrystallized from toluene to give the product in substantially pure form.

*Example 3*

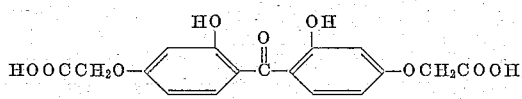

49.2 g. (0.2 mol.) of 2,2',4,4'-tetrahydroxybenzophenone, 42.4 g. (0.4 mol.) of sodium carbonate, 55.6 g. (0.4 mol.) of bromoacetic acid and 1,200 cc. of water are stirred at 90° C. for 18 hours. The mixture is made acid with HCl. The yellow solid which forms, is dissolved in 4 liters of 10% Na₂CO₃ solution. The solution is filtered and then acidified. The solid which precipitates is washed with water and recrystallized from aqueous acetic acid giving the product in substantially pure form.

*Example 4*

A mixture of the following is prepared:

| | G. |
|---|---|
| Linseed fatty acid | 36.3 |
| Glycerol | 13.8 |
| Phthalic anhydride | 19.2 |
| 4-carboxymethoxy-2,2'-dihydroxybenzophenone | 7.7 |
| Xylene | 7.7 |

The reactants are heated at about 180° C. for seven hours. The resin which results is diluted with 40 g. of xylene and then filtered to give a solid having the following analysis: Solids 61.2% and acid number 18.9.

A similar preparation is made as control using 38.4 parts of phthalic anhydride, 88.0 parts of linseed fatty acid, 27.6 parts of glycerol and 15.4 parts of xylene. The control sample had the following analysis: Solids 76.1% and acid number 6.17.

Films prepared from both samples were examined for ultraviolet absorption. The film containing the ultraviolet absorber of this invention absorbed a large portion of the energy in the 300 to 400 millimicron region while transmitting all the visible light. The control sample, however, absorbed some energy in the 300 to 400 millimicron range but only a relatively small amount as compared with the modified resin of the present invention.

The film prepared from the resin of this invention was soaked in ethanol for 100 hours but showed no evidence of loss of the absorber during this time indicating that the absorbers are chemically bonded in the resins.

In addition the resin of this invention as prepared in Example 4 and the control sample were exposed in the Fade-Ometer for 60 hours. Whereas the control sample turned dark in color, the resin of this invention showed no material color change.

*Example 5*

A polyester resin is prepared by coreacting 444 parts of phthalic anhydride, 342 parts of fumaric acid, 495 parts of propylene glycol and 5 parts of 4-carboxymethoxy-2-hydroxybenzophenone. When esterification is substantially complete, as indicated by an acid number of about 30-40, there is added styrene in a sufficient amount to equal one-half of the polyester resin and 0.02% by weight of di-tertiary-butylhydroquinone based on the total weight of the unsaturated polyester and styrene. The syrup containing 0.5% benzoyl peroxide is poured in a prelubricated glass mold and then cured for 30 minutes at 80° C., plus 30 minutes at 105° C., plus 60 minutes at 120° C. The resulting sheet (⅛" thick) is cut into 2" x 2" squares for exposure tests.

Another sample is prepared as described above only omitting the benzophenone. Exposure of these samples in a Fade-Ometer shows the polyester containing the benzophenone yellows at a much lower rate.

*Example 6*

A mixture of 115 parts of 1,4-cyclohexanedimethanol, 100 parts adipic acid and 4 parts of 4,4'-dicarboxymethoxy - 2,2' - dihydroxybenzophenone is placed in flask equipped with a stirrer, nitrogen inlet tube, and a distilling head. The mixture is heated with stirring a 190–200° C. for 4 hours during which time water is collected. Vacuum is applied to the system for several minutes to remove the last traces of water.

The resulting polyester is mixed as rapidly as possible at 60° C. with 32 parts of m-tolylenediisocyanate. The mixture is then placed in a mold and heated at 90–100° C. for 1 hour to give a sheet. Repeated soaking in ethanol did not remove the absorber.

I claim:
1. A polymeric material selected from the group consisting of light-stabilized polyester, epoxy and poly- urethane resins characterized by the presence of pendant chemically bound ester moieties of the formula:

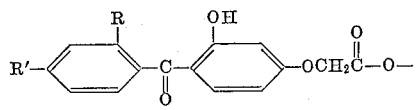

wherein R is a member selected from the group consisting of hydrogen and hydroxyl and R′ is a member selected from the group consisting of hydrogen and carboxymethoxy, said moieties constituting about 0.1% to 10.0% by weight of said polymeric material.

2. The composition of claim 1 wherein the benzophenone is 4 - carboxymethoxy-2,2′-dihydroxybenzophenone and the resinous polymeric material is a polyester resin.

3. The composition of claim 1 wherein the benzophenone is 4-carboxymethoxy-2-hydroxybenzophenone and the resinous polymeric material is a polyester resin.

4. The composition of claim 1 wherein the polymeric material is an epoxy resin.

References Cited by the Examiner

UNITED STATES PATENTS 2,976,259   3/61   Hardy et al. _____ 260—45.85
2,983,708   5/61   Lappin _____ 260—45.85

LEON J. BERCOVITZ, *Primary Examiner.*

MILTON STERMAN, DONALD E. CZAJA,
*Examiners.*